(12) United States Patent
Perets

(10) Patent No.: US 9,112,554 B1
(45) Date of Patent: Aug. 18, 2015

(54) ESTIMATION OF CORRELATED MIMO CHANNELS

(71) Applicant: Marvell International Ltd., Hamilton (BM)

(72) Inventor: Yona Perets, Ra'anana (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/301,390

(22) Filed: Jun. 11, 2014

Related U.S. Application Data

(60) Provisional application No. 61/834,232, filed on Jun. 12, 2013.

(51) Int. Cl.
*H04B 7/02* (2006.01)
*H04L 1/02* (2006.01)
*H04B 7/04* (2006.01)

(52) U.S. Cl.
CPC .................................. *H04B 7/0417* (2013.01)

(58) Field of Classification Search
CPC ...................................................... H04B 7/0417
See application file for complete search history.

(56) References Cited

U.S. PATENT DOCUMENTS

| 7,751,463 | B2 * | 7/2010 | Bottomley et al. | 375/142 |
| 8,804,612 | B1 * | 8/2014 | Chen et al. | 370/328 |
| 2005/0286651 | A1 * | 12/2005 | Egashira et al. | 375/267 |
| 2006/0035643 | A1 * | 2/2006 | Vook et al. | 455/450 |
| 2007/0058746 | A1 * | 3/2007 | Gueguen | 375/267 |
| 2007/0268181 | A1 * | 11/2007 | Howard et al. | 342/368 |
| 2009/0168730 | A1 * | 7/2009 | Baum et al. | 370/336 |
| 2010/0027713 | A1 * | 2/2010 | Huang et al. | 375/296 |
| 2011/0159831 | A1 * | 6/2011 | Jiang | 455/226.3 |

OTHER PUBLICATIONS

3GPP TS 36.101, "3rd Generation Partnership Project;Technical Specification Group Radio Access Network;Evolved Universal Terrestrial Radio Access (E-UTRA); User Equipment (UE) radio transmission and reception", Release 11, version 11.4.0, 402 pages, Mar. 2013.

* cited by examiner

*Primary Examiner* — Erin File

(57) ABSTRACT

A method includes, in a receiver, receiving a Multiple-Input Multiple-Output (MIMO) signal over a first plurality of partially-dependent communication channels that have a finite mutual dependence. Second channel responses are estimated in the receiver, for a second plurality of independent communication channels, which are derived from the partially-dependent communication channels and which have no mutual dependence. First channel responses are calculated for the first plurality of the partially-dependent communication channels, based on the second channel responses of the independent communication channels.

20 Claims, 2 Drawing Sheets

ESTIMATION OF CORRELATED MIMO CHANNELS

CROSS-REFERENCE TO RELATED APPLICATIONS

This application claims the benefit of U.S. Provisional Patent Application 61/834,232, filed Jun. 12, 2013, whose disclosure is incorporated herein by reference.

FIELD OF THE DISCLOSURE

The present disclosure relates generally to wireless communication, and particularly to methods and systems for channel response estimation.

BACKGROUND

Various types of wireless communication systems use Multiple-Input Multiple-Output (MIMO) schemes, in which a transmitter and a receiver communicate over multiple communication channels between multiple transmit and receive antennas. MIMO techniques are used, for example, in Universal Mobile Telecommunications System (UMTS), Long-Term Evolution (LTE) and LTE-Advanced (LTE-A) networks.

The description above is presented as a general overview of related art in this field and should not be construed as an admission that any of the information it contains constitutes prior art against the present patent application.

SUMMARY

An embodiment that is described herein provides a method including, in a receiver, receiving a Multiple-Input Multiple-Output (MIMO) signal over a first plurality of partially-dependent communication channels that have a finite mutual dependence. Second channel responses are estimated in the receiver, for a second plurality of independent communication channels, which are derived from the partially-dependent communication channels and which have no mutual dependence. First channel responses are calculated for the first plurality of the partially-dependent communication channels, based on the second channel responses of the independent communication channels.

In some embodiments, estimating the second channel responses includes computing a transformation that transforms the partially-dependent communication channels into the independent communication channels, and estimating the second channel responses based on the received MIMO signal and the transformation. In an embodiment, the transformation is linear. In a disclosed embodiment, computing the transformation includes estimating the transformation based on past estimates of the first channel responses. In an example embodiment, estimating the second channel responses includes transforming the received MIMO signal using the transformation, and estimating the second channel responses based on the transformed MIMO signal.

In some embodiments, receiving the MIMO signal includes receiving the MIMO signal using multiple receive antennas, and computing the transformation includes estimating the transformation based on a spatial configuration of the receive antennas. Additionally or alternatively, receiving the MIMO signal includes receiving the MIMO signal from a remote transmitter having multiple transmit antennas, and computing the transformation includes estimating the transformation based on a spatial configuration of the transmit antennas.

In another embodiment, deriving the first channel responses includes applying an inverse of the transformation to the second channel responses. In yet another embodiment, estimating the second channel responses includes estimating a respective second response of an independent communication channel based on a Signal-to-Noise Ratio (SNR) on that independent communication channel.

There is additionally provided, in accordance with an embodiment that is described herein, an apparatus including a receiver and processing circuitry. The receiver is configured to receive a Multiple-Input Multiple-Output (MIMO) signal over a first plurality of partially-dependent communication channels that have a finite mutual dependence. The processing circuitry is configured to estimate second channel responses for a second plurality of independent communication channels, which are derived from the partially-dependent communication channels and which have no mutual dependence, and to calculate first channel responses for the first plurality of the partially-dependent communication channels based on the second channel responses of the independent communication channels.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
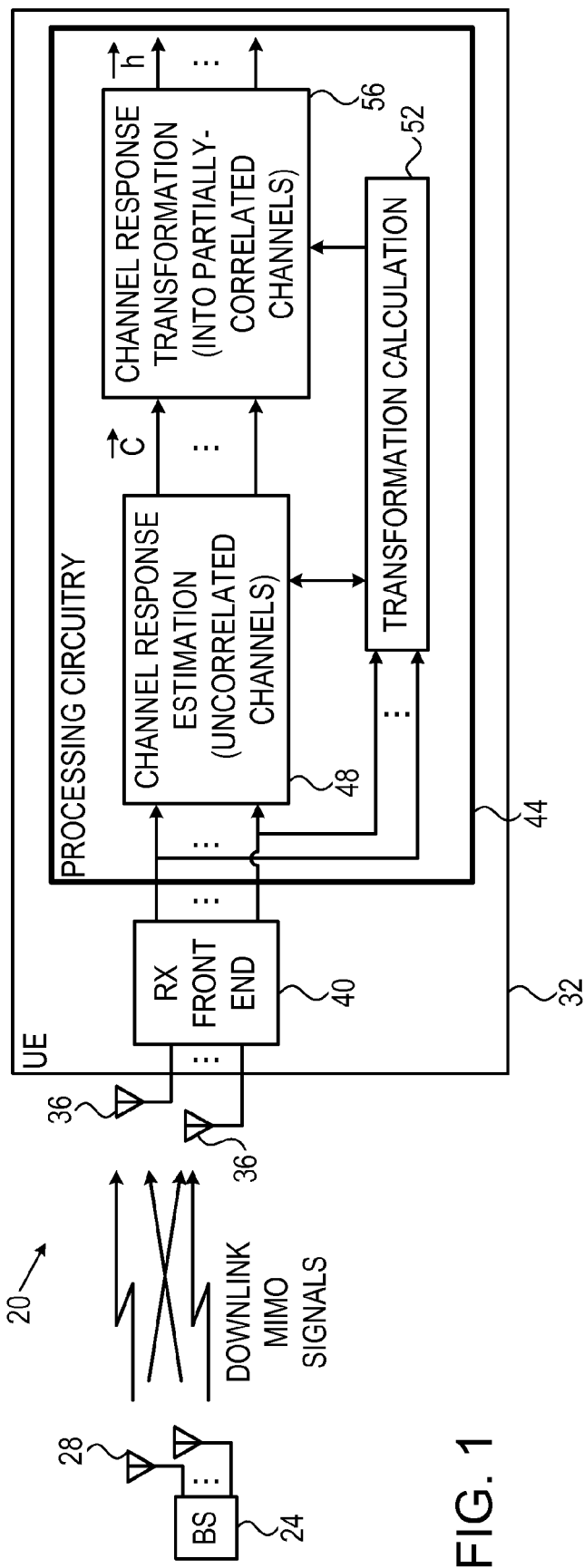
FIG. 1 is a block diagram that schematically illustrates a wireless communication system, in accordance with an embodiment that is described herein.

A MIMO communication channel between a transmitter and a receiver can be viewed as a set of communication channels, each defined between a respective transmit antenna and a respective receive antenna. Thus, when the transmitter uses $N_T$ transmit antennas and the receiver uses $N_R$ receive antennas, the total number of communication channels is $N_T \times N_R$. In a typical MIMO system, the receiver estimates the responses of these communication channels, for example in order to equalize the received signal or to compute Channel State Information (CSI) that is fed back to the transmitter.

Embodiments that are described herein provide improved methods and systems for channel estimation in MIMO communication receivers. In the description that follows, communication channels are referred to as "channels," and estimation of the response of a communication channel (e.g., time-domain impulse response or frequency-domain transfer function) is referred to as "channel estimation," for brevity. The term "channel" or "communication channel" refers to the channel between a respective transmit antenna and a respective receive antenna. The collection of channels between the set of transmit antennas and the set of receive antennas as a whole is referred to as a "MIMO channel."

In many practical transmitters and receivers, at least some of the $N_T \times N_R$ channel responses have considerable mutual dependence (e.g., correlation) relative to one another. Such a correlation or dependence occurs, for example, when the distances between the transmit antennas and/or between the receive antennas are small relative to the signal wavelength. The extent of dependence depends, for example, on the specific implementation of the antennas and on the signal frequency.

The methods and systems described herein exploit the partial mutual dependence among the channels to improve the channel estimation accuracy, in an embodiment. In some embodiments, the receiver (e.g., a mobile communication terminal) receives a MIMO signal over multiple partially-dependent channels, at least some of which have a finite mutual dependence. The receiver computes a mathematical transformation that transforms the responses of the partially-dependent channels into responses of multiple independent communication channels that have no mutual dependence.

The set of independent channels is equivalent to the set of partially-dependent channels (in the sense that both represent the MIMO channel), but the channels in the former set have substantially zero mutual dependence. The independent channels are typically not physical communication channels, but rather mathematical constructs that are used for improving the process of estimating the responses of the real-life partially-dependent channels.

The receiver typically transforms the received MIMO signal using the transformation, and applies channel estimation to the transformed MIMO signal. This process produces estimates of the responses of the independent channels. The receiver then applies an inverse of the transformation to the estimated responses of the independent channels, so as to produce estimates of the partially-dependent channels.

By performing channel estimation on independent channels instead of partially-dependent channels, the estimation accuracy improves considerably, in an embodiment. The improvement in accuracy is typically proportional to the extent of dependence among the partially-dependent channels.

Various example techniques for computing the transformation between partially-dependent and independent channels are described herein. In some embodiments the transformation is linear, whereas in other embodiments the transformation is a more general, non-linear function. The receiver typically computes the transformation based on past estimates of the partially-dependent channels.

The description that follows refers mainly to partially-correlated channels (having finite correlation with one another) and uncorrelated channels (having no correlation with one another). The disclosed techniques, however, are applicable in a wider sense to partially-dependent channels (having finite mutual dependence) and independent channels (having no mutual dependence), respectively. The terms "dependence" and "correlation" are thus used interchangeably herein.

FIG. 1 is a block diagram that schematically illustrates a wireless communication system 20, in accordance with an embodiment that is described herein. System 20 may operate in accordance with any suitable communication standard or protocol that uses MIMO. Example protocols comprise cellular standards such as UMTS, LTE or LTE-A, and Wireless Local Area Network (WLAN) standards such as IEEE 802.11.

In the example of FIG. 1, system 20 comprises a Base Station (BS) 24 that communicates using MIMO signals with a mobile communication terminal 32, also referred to as User Equipment (UE). UE 32 comprises, for example, a cellular phone, a wireless-enabled mobile or tablet computer, or any other suitable communication device. Although the description that follows refers mainly to a BS and a UE, the disclosed techniques are applicable to any other suitable type of transmitter and receiver.

Although the embodiments described herein refer mainly to downlink MIMO (MIMO signals transmitted from the BS to the UE), the disclosed techniques are applicable to uplink MIMO (MIMO signals transmitted from the UE to the BS), as well. The example of FIG. 1 shows a single BS and a single UE for the sake of clarity. Real-life systems, however, typically comprise multiple BSs and multiple UEs.

In the present embodiment, BS 24 transmits Radio Frequency (RF) downlink MIMO signals via multiple transmit antennas 28, and UE 32 receives the MIMO signals via multiple receive antennas 36. Any suitable number of transmit antennas and any suitable number of receive antennas may be used. Moreover, in the context of the present patent application and in the claims, signals that the BS transmits via a single transmit antenna (but are received in the UE via multiple receive antennas), and signals that the UE receives via a single receive antenna (but were transmitted by the BS via multiple transmit antennas) are also considered MIMO signals.

In some embodiments, UE 32 comprises a receiver (RX) front end 40 and processing circuitry 44. Front end 40 down-converts the RF signals received via receive antennas 36 to baseband, and typically performs functions such as low-noise amplification, filtering, gain control and analog-to-digital conversion. In another embodiment, front end 40 down-converts the received RF signals to some low Intermediate Frequency (IF). Analog-to-digital conversion is performed at IF, and subsequent processing (e.g., down-conversion to baseband and filtering) is performed digitally. Other suitable implementations can also be used.

Processing circuitry 44 processes the multiple digital baseband signals originating from the multiple receive antennas. Among other tasks, processing circuitry 40 estimates the responses of the multiple communication channels (between the various transmit antennas and receive antennas) using methods that are described in detail below.

In the example of FIG. 1, processing circuitry 44 comprises a channel response estimation unit 48, a transformation calculation unit 52 and a channel response transformation unit 56. Transformation calculation unit 52 calculates a mathematical transformation that transforms the responses of the partially-correlated channels (the actual channels between transmit antennas 28 of BS 24 and receive antennas 36 of UE 32) into responses of equivalent uncorrelated channels. In various embodiments the transformation comprises a linear or non-linear function, as will be explained below.

Channel response estimation unit 48 estimates the responses of the uncorrelated channels based on the received MIMO signal and the transformation. In an embodiment, unit 48 transforms the received signal using the transformation, and then applies channel response estimation to the transformed signal. In other words, channel estimation is applied to a mathematically-transformed version of the received signal, which represents the signal as it would have been received over the uncorrelated channels. The responses of the uncorrelated channels are denoted C in the figure and below. Since unit 48 performs the channel estimation process on a set of uncorrelated channels, the estimation accuracy is high relative to estimation based on the original, partially-correlated channels.

Channel response transformation unit 56 derives the responses of the partially-correlated channels (denoted $\vec{h}$ in the figure and below) from the responses of the uncorrelated channels $\vec{C}$. In an embodiment, unit 56 derives $\vec{h}$ by applying an inverse of the above-described transformation to responses $\vec{C}$.

Processing circuitry 44 of UE 32 can use the accurately-estimated responses $\vec{h}$ for various purposes, such as for equalization, demodulation, calculation of channel feedback, and/or adaptation of tracking loops (e.g., time and frequency estimators), to name just a few examples.

The UE configuration seen in FIG. 1 is an example configuration, which is depicted solely for the sake of clarity. In alternative embodiments, any other suitable UE configuration is used. For example, the functional partitioning among units 48, 52 and 56 in processing circuitry 44 is given purely by way of example. In alternative embodiments, the channel estimation tasks of the processing circuitry may be performed using any other suitable configuration of any desired number of units.

Some UE elements that are not mandatory for understanding of the disclosed techniques have been omitted from the figures for the sake of clarity. The different UE elements typically are implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements are implemented using software executing on programmable hardware, or using a combination of hardware and software elements.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some elements of UE 32 may be fabricated in a chip-set.

In some embodiments, the transformation calculated by unit 52 is a general, non-linear function. In these embodiments, the responses of the partially-correlated channels can be written as $$h_{n,m}(t,f) = g(c_{n,m}(t,f))$$ Equation 1:

wherein t denotes time, f denotes frequency, n denotes an index of the transmit antennas, m denotes an index of the receive antennas, $h_{n,m}$ denotes the responses of the partially-correlated channels, and $c_{n,m}$ denotes the responses of the uncorrelated channels.

In an embodiment, unit 52 calculates the function $g(\ldots)$ from the signal history, e.g., from past estimates of the partially-correlated channels. Then, unit estimates the responses $C_{n,m}(t,f)$ of the uncorrelated channels using the received signal and the transformation $g(\ldots)$. In various embodiments, the transformation $g(\ldots)$ may vary over time and/or frequency. Unit 56 then transforms $C_{n,m}(t,f)$ back into $h_{n,m}(t,f)$ by applying $g(\ldots)$.

In other embodiments (which can be regarded as a special case of the general non-linear case above), transformation $g(\ldots)$ is a linear transformation. In these embodiments, the relation between $C_{n,m}(t,f)$ and $h_{n,m}(t,f)$ can be written in matrix form as $$H(t,f) = g(C(t,f)) = A(t,f) \cdot C(t,f)$$ Equation 2:

wherein A denotes a matrix that is applied to the uncorrelated channel responses $C(t,f)$ in order to obtain the partially-correlated channel responses $H(t,f)$.

In an example embodiment, unit 52 uses a signal history to calculate the antenna correlation (including amplitude and phase) for each pair of transmit antenna and receive antenna, and generates the matrix $A(t,f)$. Unit 48 then estimates the matrix $C(t,f)$, which gives the respective responses of the uncorrelated channels, using the received signal and matrix $A(t,f)$. Unit 56 then transforms $C(t,f)$ back into $H(t,f)$ by multiplication by $A(t,f)$.

In various embodiments, processing circuitry 44 in UE 32 calculates the transformation between the responses of the partially-correlated channels and the responses of the uncorrelated channels in various suitable ways. In an example embodiment, processing circuitry 44 estimates the antenna correlation (including amplitude and phase) for each {transmit antenna, receive antenna} pair, based on the signal history. Let R denote the matrix of antenna correlations.

Processing circuitry 44 then represents matrix R, using Cholesky decomposition, as the product $R = A \cdot A'$, wherein A is a lower-triangular matrix. Thus, the received signal (e.g., pilot signal) Y is whitened by left multiplication by $L = \text{inv}(A)$, yielding $Yw = L \cdot Y$. Processing circuitry 44 then estimates the channel response C based on the Yw samples (e.g., using Wiener filtering or other suitable method), to produce results $\hat{C}$. Finally, processing circuitry 44 recovers the estimated channel $\hat{H}$ by calculating $\hat{H} = A * \hat{C}$.

The channel estimation schemes described above are depicted purely by way of example. In alternative embodiments, any other suitable channel estimation scheme can be used.

In some embodiments, the transformation (e.g., function g or matrix A described above) can be estimated with improved accuracy by considering a-priori information as to the physical spatial configuration of transmit antennas 28 and/or receive antennas 36. For example, in a UMTS base station (referred to as eNB) that transmits MIMO signals via a cross-polarized antenna array, the channel spatial correlation can be modeled as $R_{spat} = P(R_{eNB} \hat{X} \Gamma \hat{X} R_{UE}) P^T$, following the notation of 3GPP Technical Specification TS 36.101. In this equation, P denotes the permutation matrix, $R_{eNB}$ denotes the spatial correlation matrix at the base station, $R_{UE}$ denotes the spatial correlation matrix at the UE, and F denotes the polarization correlation matrix.

In various embodiments, unit 52 may obtain the a-priori information regarding the spatial configuration of transmit antennas 28 and/or receive antennas 36 in various ways. Information as to the arrangement of receive antennas 36 (of UE 32) may be pre-programmed in unit 52, in an embodiment. Information as to the arrangement of transmit antennas 28 (of BS 24) may be provided to the UE via suitable signaling, or estimated autonomously by the UE, for example.

This model has a very small number of parameters that should be estimated, and can therefore be used to improve the estimation accuracy (since the estimation accuracy typically depends on the number of estimated parameters—the accuracy decreases as the number of parameter increases). The example above refers to the known physical arrangement of the transmit antennas. Additionally or alternatively, information regarding the physical arrangement of the receive antennas can be used, as well.

In some embodiments, channel response estimation unit 40 estimates the response of a given uncorrelated channel with estimation parameters that are chosen based on the Signal-to-Noise Ratio (SNR) on that uncorrelated channel. This scheme also helps to improve the channel estimation accuracy. In an example embodiment, the estimation parameter comprises integration or averaging time. In this embodiment, unit 48 estimates the SNRs on the various uncorrelated channels (after applying transformation g or matrix A to the received MIMO signal). For an uncorrelated channel having high SNR, unit 48 estimates the channel response over a relatively short time interval. For an uncorrelated channel having poor SNR, unit 48 estimates the channel response over a relatively long time interval. Alternatively, unit 48 may account for SNR differences among the uncorrelated channels in any other suitable way.

Figure 2:
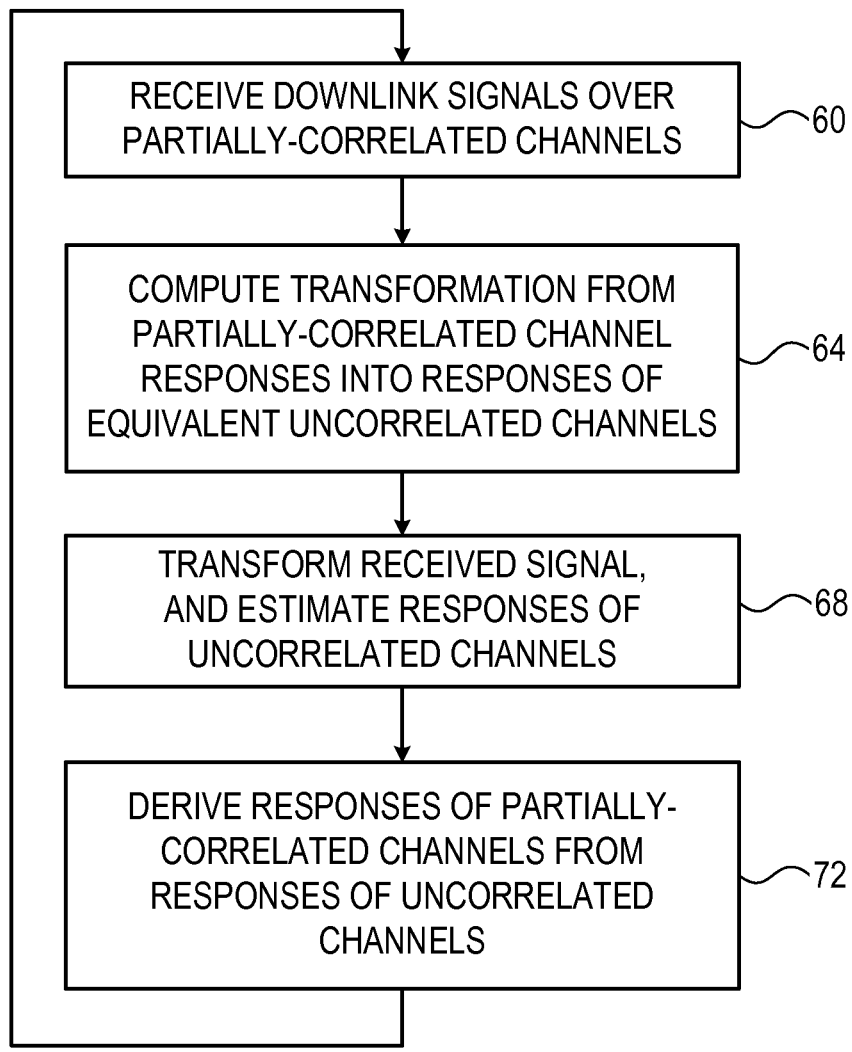
FIG. 2 is a flow chart that schematically illustrates a method for channel estimation, in accordance with an embodiment that is described herein.

FIG. 2 is a flow chart that schematically illustrates a method for channel estimation, in accordance with an embodiment that is described herein. The method begins with RX front end 40 of UE 32 receiving a downlink MIMO signal from BS 24, at a reception operation 60. The MIMO signal is received over multiple partially-correlated channels, each partially-correlated channel defined between one of transmit antennas 28 and one of receive antennas 36.

At a transformation computation operation 64, transformation calculation unit 52 computes a transformation that transforms the responses of the partially-correlated channels into responses of equivalent uncorrelated channels.

At an uncorrelated estimation operation 68, channel response estimation unit 48 estimates the responses of the uncorrelated channels based on the received MIMO signal and the transformation. Typically, unit 48 applies the transformation to the received MIMO signal, and then applies channel response estimation to the transformed signal.

At a partially-correlated estimation operation 72, channel response transformation unit 56 derives the responses $\vec{h}$ of the partially-correlated channels from the responses $\vec{C}$ of the uncorrelated channels, e.g., by applying an inverse of the above-described transformation to C.

It is noted that the embodiments described above are cited by way of example, and that the presently claimed invention is not limited to what has been particularly shown and described hereinabove. Rather, the scope of the presently claimed invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
    in a receiver, receiving a Multiple-Input Multiple-Output (MIMO) signal over a first plurality of partially-dependent communication channels that have a finite mutual dependence;
    estimating in the receiver second channel responses, for a second plurality of independent communication channels, which are derived from the partially-dependent communication channels and which have no mutual dependence, wherein estimating the second channel responses comprises applying a transformation that transforms the partially-dependent communication channels into the independent communication channels; and
    calculating first channel responses for the first plurality of the partially-dependent communication channels, based on the second channel responses of the independent communication channels.

2. The method according to claim 1, wherein estimating the second channel responses comprises estimating the second channel responses based on the received MIMO signal and the transformation.

3. The method according to claim 1, wherein the transformation is linear.

4. The method according to claim 1, further comprising estimating the transformation based on past estimates of the first channel responses.

5. The method according to claim 1, wherein estimating the second channel responses comprises transforming the received MIMO signal using the transformation, and estimating the second channel responses based on the transformed MIMO signal.

6. The method according to claim 1, wherein receiving the MIMO signal comprises receiving the MIMO signal using multiple receive antennas, and further comprising estimating the transformation based on a spatial configuration of the receive antennas.

7. The method according to claim 1, wherein receiving the MIMO signal comprises receiving the MIMO signal from a remote transmitter having multiple transmit antennas, and further comprising estimating the transformation based on a spatial configuration of the transmit antennas.

8. The method according to claim 1, wherein calculating the first channel responses comprises applying an inverse of the transformation to the second channel responses.

9. The method according to claim 1, wherein estimating the second channel responses comprises estimating a respective second response of an independent communication channel based on a Signal-to-Noise Ratio (SNR) on that independent communication channel.

10. Apparatus, comprising:
    a receiver, which is configured to receive a Multiple-Input Multiple-Output (MIMO) signal over a first plurality of partially-dependent communication channels that have a finite mutual dependence; and
    processing circuitry, which is configured to estimate second channel responses for a second plurality of independent communication channels, which are derived from the partially-dependent communication channels and which have no mutual dependence, wherein estimation of the second channel responses comprises applying a transformation that transforms the partially-dependent communication channels into the independent communication channels, and to calculate first channel responses for the first plurality of the partially-dependent communication channels based on the second channel responses of the independent communication channels.

11. The apparatus according to claim 10, wherein the processing circuitry is configured to estimate the second channel responses based on the received MIMO signal and the transformation.

12. The apparatus according to claim 10, wherein the transformation is linear.

13. The apparatus according to claim 10, wherein the processing circuitry is configured to estimate the transformation based on past estimates of the first channel responses.

14. The apparatus according to claim 10, wherein the processing circuitry is configured to transform the received MIMO signal using the transformation, and to estimate the second channel responses based on the transformed MIMO signal.

15. The apparatus according to claim 10, wherein the receiver is configured to receive the MIMO signal using multiple receive antennas, and wherein the processing circuitry is configured to estimate the transformation based on a spatial configuration of the receive antennas.

16. The apparatus according to claim 10, wherein the receiver is configured to receive the MIMO signal from a remote transmitter having multiple transmit antennas, and wherein the processing circuitry is configured to estimate the transformation based on a spatial configuration of the transmit antennas.

17. The apparatus according to claim 10, wherein the processing circuitry is configured to derive the first channel responses by applying an inverse of the transformation to the second channel responses.

18. The apparatus according to claim 10, wherein the processing circuitry is configured to estimate a respective second response of an independent communication channel based on a Signal-to-Noise Ratio (SNR) on that independent communication channel.

19. A mobile communication terminal comprising the apparatus of claim 10.

20. A chipset for processing signals in a mobile communication terminal, comprising the apparatus of claim 10.

* * * * *